United States Patent [19]

Sadhukhan et al.

[11] 4,094,758

[45] June 13, 1978

[54] PROCESS FOR PREPARING HIGHER OXIDES OF THE ALKALI AND ALKALINE EARTH METALS

[76] Inventors: James C. Fletcher, Administrator of the National Aeronautics and Space Administration, with respect to an invention of; Pasupati Sadhukhan, La Verne; Alexis T. Bell, Oakland, both of Calif.

[21] Appl. No.: 760,810

[22] Filed: Jan. 19, 1977

[51] Int. Cl.² .......................... B01K 1/00; C01D 1/02
[52] U.S. Cl. .................................. 204/164; 204/175; 423/582; 423/583
[58] Field of Search ................ 204/164, 175; 423/582, 423/583

[56] References Cited
PUBLICATIONS

Vol'Nov et al., Russian Journal of Inorganic Chemistry, Aug. 1967, vol. 12, No. 8, pp. 1187, 1188.

*Primary Examiner*—F.C. Edmundson
*Attorney, Agent, or Firm*—Darrell G. Brekke; John R. Manning

[57] ABSTRACT

The present invention relates to a process for preparing high purity inorganic higher oxides of the alkali and alkaline earth metals by subjecting the hydroxide of the alkali or alkaline earth metal to a radio frequency discharge sustained in oxygen. The invention is particularly adaptable to the production of high purity potassium superoxide ($KO_2$) by subjecting potassium hydroxide to glow discharge sustained in oxygen under the pressure of about 0.75 to 1.00 torr.

6 Claims, 3 Drawing Figures

PROCESS FOR PREPARING HIGHER OXIDES OF THE ALKALI AND ALKALINE EARTH METALS

The invention described herein was made in the performance of work under a NASA contract and is subject to provisions of Section 305 of the National Aeronautics and Space Act of 1958, Public Law 85-568 (72 Stat 435; 42 U.S.C. 2457).

BACKGROUND OF THE INVENTION

1. Field of the Invention

The present invention relates to the process for preparing high purity inorganic higher oxides of the alkali and alkaline earth metals by subjecting the hydroxide of the alkali or alkaline earth metals to a radio frequency discharge sustained in oxygen.

Inorganic superoxides have the general formula $MO_2$ or $L(O_2)_2$ where M and L are alkali and alkaline earth metals respectively. Superoxides are strongly yellow in color and react with water in either the liquid or vapor state at ambient temperatures to generate molecular oxygen and alkaline hydroxides which cån absorb carbon dioxide according to the reactions:

$$2 MO_2 (S) + H_2O (l) \rightarrow 2 MOH (S) + 3/2 O_2 (g) \quad (1)$$

$$2 MOH (S) + CO_2 (g) \rightarrow M_2CO_3 (S) + H_2O (l) \quad (2)$$

Overall:

$$2 MO_2 (S) + CO_2 (g) \rightarrow M_2 CO_3 (S) + 3/2 O_2 (g) \quad (3)$$

As indicated by the above reactions a single superoxide compound can be used for supplying oxygen necessary for human respiration while simultaneously removing carbon dioxide given off as a product of that respiration. Furthermore, because of their strong oxidizing properties, superoxides can destroy air-borne bacteria and toxic or noxious materials present in the atmosphere. Superoxides are therefore ideally suited for non-regenerative air revitalization in life support systems encountered in manned space flight capsules and in submarines.

2. Description of the Prior Art

Potassium superoxide ($KO_2$) has been available commercially for at least 30 years and has been used as an oxygen source in emergency breathing apparatus used in various rescue operations such as fire and mine accidents and military first aid. Potassium superoxide, however, has been a relatively expensive compound being priced at about $5.00/lb. since prior art methods for forming the superoxide have employed expensive starting compounds or elaborate and expensive techniques.

One prior art commercial method for the production of potassium superoxide involves the use of molten potassium metal which is atomized into a chamber filled with oxygen at 1.2 atmospheres and 300° C with the superoxide product being collected at the bottom of the chamber. This prior art method for the production of superoxides is expensive since metallic potassium is used as the starting material and is hazardous since metallic potassium can react with water and air to result in a explosion. This method is also inefficient since the metallic potassium is corrosive to the apparatus.

Potassium superoxide has also been prepared by reacting potassium hydroxide with the gaseous oxygen. This prior art method has resulted in problems with purity of the superoxide produced. The purity of typical product obtained from the reaction of potassium hydroxide with oxygen at 1 atmosphere and 210° C is 20% which increases to 34% at a temperature of 510° C.

Another prior art method has included the synthesis of potassium superoxide by subjecting solid potassium hydroxide to an electric discharge sustained in oxygen yielding an 80.5% conversion. This method involves a direct current discharge at 1100 to 1200 volts and a pressure of 0.5 torr and a discharge power of 500 watts. This process has a number of disadvantages since it requires the use of high voltage and discharge power to sustain the discharge. In addition, in direct current discharge the electrodes are in direct contact with the discharged gas, in this case oxygen which results in sputtering of the electrodes resulting in the sputtered electrode particles contaminating the surperoxide product.

Other prior art methods has involved the synthesis of potassium superoxide from the oxidation of metallic potassium in liquid ammonia, the oxidation of the lower oxides of potassium and the disproportionation of potassium peroxide diperoxyhydrate ($K_2O_2.2H_2O_2$). However, all the prior art methods for the production of superoxide have either not provided a sufficiently pure superoxide or have involved use of expensive chemicals or a large number of expensive and elaborate processing steps.

SUMMARY OF THE INVENTION

The disadvantages and limitations of the prior art are obviated by the present invention which provides an efficient and relatively inexpensive method of preparing high purity inorganic higher oxides or the alkali and alkaline earth metals. In particular, the present invention achieves its advantages in producing superoxide of potassium by subjecting the solid hydroxide to a radio frequency discharge sustained in oxygen.

The process of the present invention exhibits numerous advantages over the prior art since potassium hydroxide, the starting compound, is a rather inexpensive chemical (30¢ to 40¢ per lb.) as compared to metallic potassium which is $3.00 to $4.00/lb. Also in contrast to prior art methods the present invention employs potassium hydroxide which is easier to use and does not corrode the processing container.

The present invention is in addition a one step operation capable of producing a high conversion percentage of potassium hydroxide to high purity potassium superoxide. In comparison with the use of electric discharges in the prior art the present invention does not require a high voltage or high discharge power to sustain the discharge during the reaction. Since a radio frequency discharge is used there is no direct contact between the electrodes with the discharged oxygen. As a result contamination of the superoxide product by sputtered material from the discharge electrode is eliminated. The present invention therefore provides an inexpensive uncomplicated process for producing high purity higher oxides of the alkali and alkaline earth metals.

BRIEF DESCRIPTION OF THE DRAWING

The invention will be more fully understood from the following detailed description taken in conjunction with the accompanying drawing in which.

DESCRIPTION OF THE PREFERRED EMBODIMENT

The preferred embodiment of the present invention contemplates the synthesis of high purity inorganic higher oxides of alkali and alkaline earth metals by subjecting the hydroxides of the metals to a radio frequency discharge sustained in oxygen. The process of the present invention has produced the superoxides or rubidium, cesium and potassium and the peroxides of lithium and calcium by subjecting the hydroxide of the metals to a radio frequency discharge sustained in oxygen.

Figure 1:
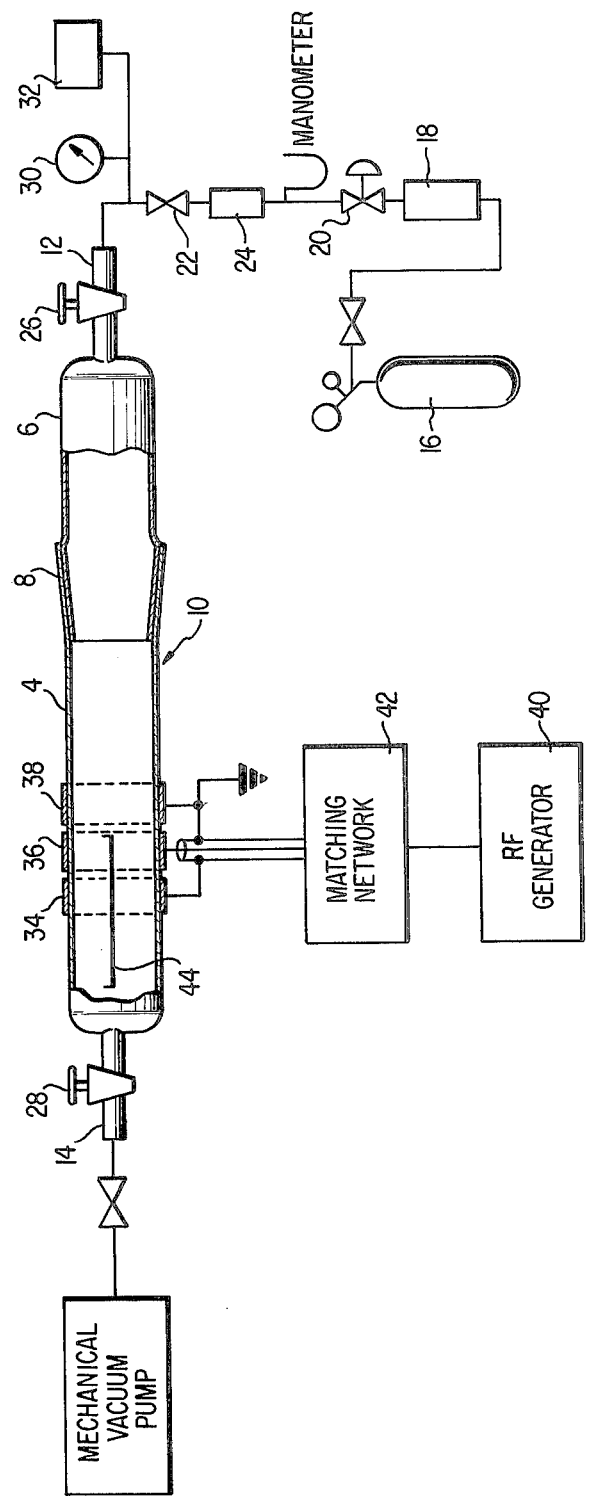
FIG. 1. is a schematic pictorial view illustrating the major elements of an appartus for making the alkali and alkaline earth metal superoxides of the present invention.

The methods and procedures of the present invention are achieved by employing an apparatus as depicted in FIG. 1 wherein a discharge reactor 10 is formed by two pyrex glass tubes 4 and 6 held together by ground glass 8 to provide a reactor of the dimensions 14 inches long × 1¼ inches in diameter. The reactor 10 is connected at one end 12 to a flow system which provides oxygen and at the other end 14 to a mechanical vacuum pump. Oxygen from cylinder 16 is first dried by passage through a silica gel dryer 18 and then reduced in pressure to slightly above one atmosphere by a pressure regulator 20. The flow is then metered into an evacuated reactor through a metering valve 22 with the rate of oxygen flow measured by a rotameter 24. Stopcock 26 located at end 12 and stopcock 28 located at end 14 allow the discharge reactor 10 to be isolated from the flow and vacuum systems and to be transferred without contamination with the atmosphere. The pressure within the reactor 10 is measured by a gauge 30 and a McLeod guage 32.

The power to the discharge reactor 10 is supplied through three ring shaped electrodes 34, 36, and 38 mounted on the outside of the discharge reactor 10. While the use of three electrodes provides an advantage in positioning the electrodes, it will be understood that different numbers and configurations of electrodes may be employed, such as capacitive electrodes or inductive coils, to achieve the advantages of the invention. Electrodes 34, 36, and 38 are coupled to a radio frequency generator represented as box 40 (Tracerlab RFG-600) via an impedance matching network represented by box 42 (Tracerlab PIA-600). The generator operates at a frequency of 13.56 megahertz (mhz) and can deliver up to 350 watts. Power dissipated in the discharge is measured by a power meter located in the generator. Electrodes 34, 36, and 38 are cooled by an air blower (not shown) mounted near the electrodes. In the discharge reactor 10 a glass boat 44 is employed to position and contain the hydroxide of the alkaline and alkaline earth metal to be converted into its respective higher oxides.

For the purposes of illustrating the present invention the preparation of potassium superoxide from potassium hydroxide will be described. It has been observed that the particle size of the potassium hydroxide has a strong influence on the purity of the superoxide product. As a result, it has been found desirable to react the hydroxide in the form of a finely divided powder obtained by grinding or crushing the hydroxide thoroughly before introducing the hydroxide into the discharge reactor. Since potassium hydroxide is hygroscopic it is preferrable to carry out the conversion of the pellets into powder in a dry box purged continuously with nitrogen. The finely divided potassium hydroxide is placed in the bottom of glass boat 44 of the dimensions 3 - 3/13 inches × 1 1/16 inches in as thin a layer as possible. Glass boat 44 is then inserted in the reactor and isolated by turning stopcock 26 and 28 to their closed position and the reactor is removed from the inert environment and connected as shown in FIG. 1. Subsequently, stopcock 28 is opened and reactor 44 is evacuated before a flow of oxygen is established inside the discharge reactor. Electrodes 34, 36, and 38 are positioned outside the discharge reactor 10 over the glass boat 44 as depicted in FIG. 1. Discharge is then commenced so that glass boat 44 containing the fine powders of potassium hydroxide is placed inside the glow of the discharge zone. The potassium hydroxide appears to melt and the molten material subsequently solidifies to form a thin crust at the top. This crust slowly, but not uniformly becomes yellow in color indicating the formation of potassium superoxide. Since the position of the glass boat in discharge reactor 10 affects the purity of the product the electrodes may be repositioned over the glass boat containing the potassium hydroxide to obtain the maximum conversion of potassium hydroxide to potassium superoxide.

After carrying out the reaction, the discharge reactor is isolated from atmospheric environment using stopcocks 26 and 28 at the ends of reactor 10. The electrodes are disconnected from the reactor and the reactor is taken into a dry box purged continuously with dry nitrogen. The reactor is opened up by dismantling the ground glass joint 8 and the product is collected. This approach of collection of product is necessary in case of superoxides since superoxides readily react with atmospheric moisture.

It has been observed that practically no conversion of potassium hydroxide into potassium superoxide takes place with the material below the thin crust as it acts as a diffusion barrier for the discharge oxygen. Rapid melting must therefore be avoided in order to obatin as high as possible conversion of potassium hydroxide to superoxide. Consequently, to avoid rapid melting of the entire material either the electrodes or the glass boat may be positioned in such a fashion so that one half of boat 44 containing the potassium hydroxide is positioned inside the glow of the discharge and the other half outside. As depicted in FIG. 1 this arrangement allows the material inside the glow to melt with a gradual spread of the melting zone so that it eventually covers two-thirds of the area of boat 44. The molten zone slowly solidifies and forms a thin crust as heretofore described. The particles of potassium hydroxide closest to the molten zone become yellow first with the yellow zone spreading outside the glow region with the intensity of the color increasing with time and with the yellow zone resulting in the highest conversion of potassium hydroxide to potassium superoxide.

Figure 2:
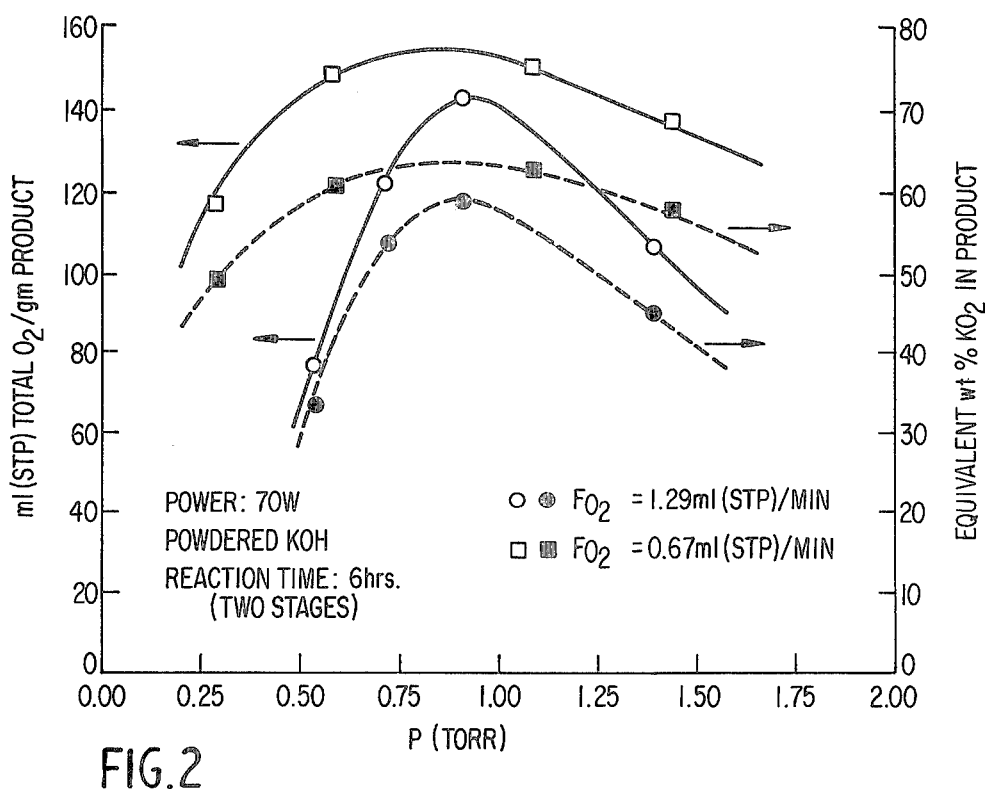
FIG. 2 is a set of curves illustrating the total available oxygen and equivalent weight percent of potassium superoxide in relation to the discharge pressure for the potassium hydroxide starting material.

During the reaction between the potassium hydroxide and the active species from the discharged oxygen both potassium superoxide and peroxide are formed although the amount of peroxide is observed to be much less than the superoxide. Both the peroxide and superoxide are capable of liberating oxygen with the results being reported in terms of total available oxygen from both the oxides and the equivalent weight percent of potassium superoxide as illustrated in FIG. 2. FIG 2. shows that both the pressure and flow rate of oxygen have a strong influence on the conversion of potassium hydroxide to higher oxides. At a given flow rate of oxygen the total amount of oxygen available from the product increases with pressure, passes through a maximum, and then decreases.

For the flow rates depicted in FIG. 2 the maximum conversions occurs between 0.75 and 1.00 torr. The highest conversion is equivalent to 63% by weight of potassium superoxide and occurs at 0.85 torr and a flow rate of 0.67 ml (stp) oxygen per minute. Since the equivalent weight percent of potassium superoxide was calculated from the total oxygen available the shapes of the two curves for a given flow rate are similar.

Figure 3:
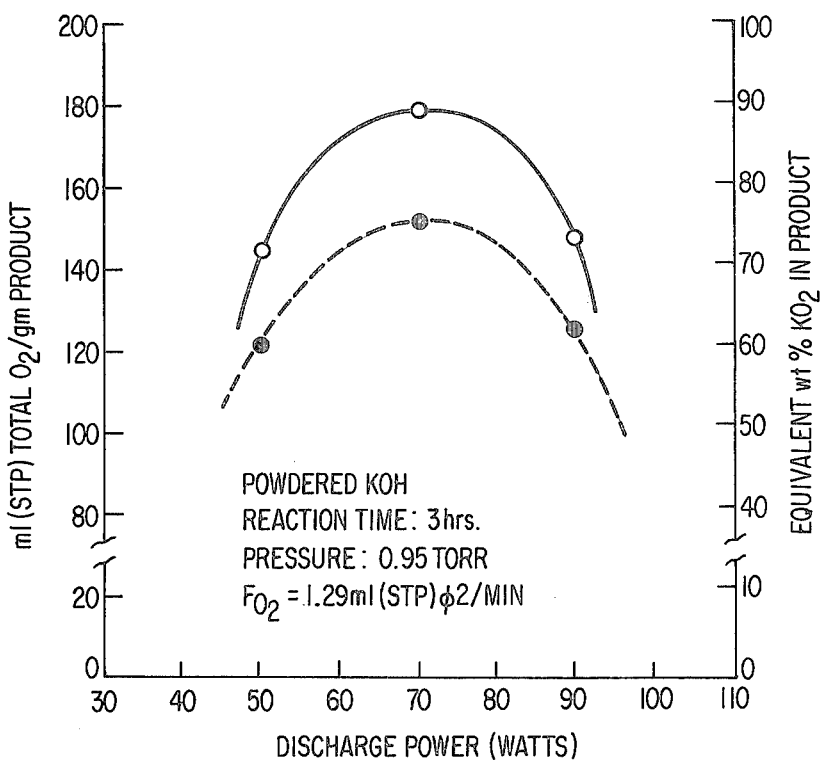
FIG. 3. is a set of curves illustrating the total available oxygen and equivalent weight percent potassium superoxide in relation to the discharge power for potassium hydroxide as a starting material.

Referring now to FIG. 3 the set of curves depicted represent the effect of discharge power on the conversion of potassium hydroxide to higher oxides. The total available oxygen and hence the equivalent weight percent of potassium superoxide increases with increasing power, passes through a maximum and then decreases with further increases of discharge power.

A test conducted at 70 watts resulted in 73% conversion in terms of equivalent weight percent potassium superoxide although the reaction time is one-half that for the test with similar operating conditions as depicted in FIG. 2 which, in comparison, illustrates a conversion of 60%. In the conversion of potassium hydroxide to superoxides the control of the particle size of the potassium hydroxide and appropriate choice of reaction time increases the conversion percentage.

Higher oxygen of lithium and calcium were also produced by subjecting the hydroxides of these metals to radio frequency discharge sustained in oxygen. The formation of the superoxide of lithium and calcium does not take place at a significant rate although a high conversion to peroxides was observed. In the case of lithium the conversion of lithium peroxide was 90% by weight which occurred at 0.8 torr for a flow rate of 1.25 ml (stp) oxygen per minute. A four hour discharge and reaction time was used.

In the tests with calcium hydroxide the maximum conversion was 95% by weight to calcium peroxide which occurred at a pressure of 0.25 torr. The reaction and discharge time was four hours. The rate of flow of oxygen did not have any effect on the precent conversion to calcium peroxide.

Higher oxides of rubidium and cesium were prepared by subjecting the hydroxides of rubidium and cesium to radio frequency discharge sustained in oxygen. The hydroxides of rubidium and cesium were placed directly inside the discharge reactor with oxygen introduced immediately. As a result the entire material quickly melted into the formation of a thin crust which prevented the reaction of the material below the crust resulting in a lower conversion yield. In terms of an equivalent weight percent of the superoxides the conversion was 43% for rubidium hydroxide and 58% for cesium hydroxide.

The present invention, may be implemented in a variety of ways such as changing reaction time, discharge power, pressure, particle size, and flow rate of oxygen to produce greater yields of the higher oxides by sustained radio frequency discharges in oxygen. It will be understood by those skilled in the art that these and other changes and substitutions may be made to increase yields and that such changes and substitutions are within the spirit and scope of the invention as defined in the appended claims.

What is claimed is:

1. A process for preparing the inorganic higher oxides of the alkali metals comprising:
   (a) positioning the hydroxide of an alkali metal into a radio frequency discharge reactor in such a manner that about half of said hydroxide is within the glow discharge region of said reactor and the rest is outside of said region;
   (b) introducing a flow of oxygen into said radio frequency discharge reactor;
   (c) establishing a glow discharge by applying between about 50 to 90 watts of power to the reactor until the higher oxide formation is completed.

2. The method of claim 1 additionally comprising crushing said hydroxide to form a finely divided powder.

3. The method of claim 2 additionally comprising preparing said powder in a water free atmosphere purged with nitrogen.

4. The method of claim 3 wherein said hydroxide is potassium hydroxide and said higher oxide produced is potassium superoxide.

5. The method of claim 4 wherein the production of potassium superoxide is carried out from powdered potassium hydroxide at a pressure of about 0.95 torrs with a power of about 70 watts for a period of about 3 hours.

6. The method of claim 1 wherein said discharge is applied by inductive coils mounted on the outside of said discharge reactor.

* * * * *